United States Patent
Colligan et al.

(10) Patent No.: US 6,298,443 B1
(45) Date of Patent: Oct. 2, 2001

(54) METHOD AND SYSTEM FOR SUPPLYING A CUSTOM SOFTWARE IMAGE TO A COMPUTER SYSTEM

(75) Inventors: Tom Colligan; Jonathan Ellis; Hunter Robertson, all of Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/066,128

(22) Filed: Apr. 24, 1998

(51) Int. Cl.$^7$ .................................................. H04L 9/00
(52) U.S. Cl. .................................................. 713/200; 713/2
(58) Field of Search ......................... 713/200, 2

(56) References Cited

U.S. PATENT DOCUMENTS

| | | |
|---|---|---|
| 4,433,207 | 2/1984 | Best . |
| 4,688,169 | 8/1987 | Joshi .................................. 364/200 |
| 4,785,361 | 11/1988 | Brotby . |
| 5,099,516 | 3/1992 | Durkin et al. . |
| 5,337,357 | * 8/1994 | Chou et al. .............................. 380/4 |
| 5,371,792 | 12/1994 | Asai et al. . |
| 5,388,267 | 2/1995 | Chan et al. . |
| 5,398,285 | 3/1995 | Borgelt et al. . |
| 5,416,840 | 5/1995 | Cane et al. . |
| 5,423,028 | 6/1995 | Schieve et al. . |
| 5,581,740 | 12/1996 | Jones . |
| 5,694,582 | 12/1997 | Pearce . |
| 5,745,568 | 4/1998 | O'Connor et al. . |
| 5,894,571 | * 4/1999 | O'Connor ............................. 713/2 |
| 6,122,734 | * 9/2000 | Jeon ..................................... 713/2 |

FOREIGN PATENT DOCUMENTS

| | | |
|---|---|---|
| 0 119 886 A1 | 2/1984 | (EP) . |
| 0 302 710 A2 | 8/1988 | (EP) . |
| 2 154 769 A | 9/1985 | (GB) . |
| 2 309 104 A | 7/1997 | (GB) . |

OTHER PUBLICATIONS

Compaq, "SmartStart Installation", Nov., 1994.

* cited by examiner

*Primary Examiner*—Ly V. Hua
(74) *Attorney, Agent, or Firm*—Haynes and Boone, L.L.P.

(57) ABSTRACT

A method and system for supplying a software image to a computer system utilize a custom-programmed compact disk (CD) ROM that is configured for a specified individual computer system and constrained to be downloaded to and operable on only the specified individual computer system. The method and system further utilize an installation procedure for restoring the specified computer system to the software state that the computer was in at the time the computer left the factory after initial configuration and downloading. The custom-programmed CD ROM 106 is delivered to a customer in combination with a bootable flexible diskette 108, and an instructional technical instruction sheet for usage by the customer to restore the computer system to a "factory new" software condition.

51 Claims, 7 Drawing Sheets

METHOD AND SYSTEM FOR SUPPLYING A CUSTOM SOFTWARE IMAGE TO A COMPUTER SYSTEM

BACKGROUND OF THE INVENTION

A computer system is typically purchased and supplied as a combined hardware-software system. In the past, software has been supplied via flexible (floppy) diskettes that was manually loaded into a diskette drive by a purchaser and downloaded diskette-by-diskette. As the memory and disk drive capacity has expanded and the size of software images has soared, loading of software via flexible diskette has become very cumbersome. For example, the size of a typical software system image has expanded to a range of 2 to 600 megabytes and is expected to continuing growing in the future. A large number of flexible diskettes, for example on the order of 50 diskettes, is typically used to transfer a typical software system image.

Many computer system suppliers have replaced flexible diskettes with high-capacity compact disk (CD) ROMs for supplying software images. The computer system suppliers that supply software on CD ROMs only sell a limited number of hardware configurations (for example 4 to 8) that utilize even fewer software configurations (for example 2 or 3). The software system includes a common operating system, hardware drivers, software utilities, and application programs for usage among all computer systems of a particular configuration. These computer system suppliers have the software diskettes pressed en masse, generally in batches in the ten thousand to the hundred thousands range, so that identical software systems are supplied interchangeably to many computer systems.

The conventional hardware computer system typically includes various different hardware subsystems. During installation of these conventional mass-produced software systems to hardware computer systems, some software configuration is generally performed. The downloading process often includes routines that automatically detect an identification of the hardware subsystems and build appropriate drivers for the detected subsystems.

Many different hardware vendors supply the hardware subsystems and often many different software suppliers supply software modules supplied on the mass-produced diskettes. A common problem with the conventional technique for supplying software to a computer system using mass-produced software is that various inconsistencies often arise among the various hardware subsystems and the software modules. The first time a particular hardware-software system configuration is combined is when a customer attempts to bring up the system, long after the system has left the factory. A customer typically does not have the expertise to correctly set up various configurable characteristics of the hardware and software to optimally execute the software on a particular hardware configuration, Therefore, bringing up a system is often a painful and time-consuming exercise for the both the computer system customer and the vendor with the customer making frequent usage of the vendor's customer help services.

Dell Computer Corporation™ avoids the difficulties of software-hardware system integration by "custom" building each computer system to order. A customer orders a computer, specifying particular hardware subsystems and software packages. The software-hardware integration, including installation of particular drivers for the hardware that is installed in full native mode in the computer, is performed in the factory by Dell Computer Corporation™, tested, and assured of compatibility before the combined system leaves the factory. The software is thus assured to operate with the particular ordered hardware system and also assured to operate in conjunction with particular drivers and the operating system.

One consequence of the build-to-order business model is that each software load is potentially unique. Therefore, software cannot be supplied by mass-produced diskettes. Dell™ has therefore supplied a software image by bringing up the software on the specified hardware in the factory, assuring that the software load operates properly, then shipping the computer system with the software image loaded onto a hard disk drive in the computer system.

The hard disk drive is a somewhat volatile medium, therefore the image in the hard disk drive may be changed, either intentionally or unintentionally. Because the software image is supplied on the hard disk drive, any unsuitable changes in the software image are not easily corrected. When a customer has a problem that is corrected by writing correct data to the hard disk and the customer has not made a backup medium, then Dell™ makes the corrections by supplying a replacement hard disk containing the original supplied software image. Typically a third party maintenance person is sent to the customer site to swap out the corrupted hard drive with the replacement hard drive and perform the installation process. Dell™ makes the replacement whether the difficulty with the hard drive is caused by system failure or by unauthorized or prohibited actions by the customer. For example, a customer may install a different hardware subsystem and incorrectly install software drivers for controlling the hardware subsystem, thereby corrupting the hard drive, The replacement hard disk drives are used as a primary method for sending software to the field to correct many problems. The problems include, for example, corruption of files by the customer or by a virus, difficulties with installation of a hardware subsystem that was not supplied by the factory, a decision by the customer to change the operating system, a bad factory software download, malfunction of the hard drive, and the like.

Unfortunately, replacement of the hard drive is expensive and often inconvenient for the customer. Hard drive replacement is expensive not only due to the cost of the hard drive but also due to the equally large cost of a third party maintenance call and extensive handling and testing of the returned hard drive.

What is needed is a system and technique for supplying a "build-to-order" software image to a computer system that reduces cost and improves convenience.

SUMMARY OF THE INVENTION

A method and system for supplying a software image to a computer system utilize a custom-programmed compact disk (CD) ROM that is configured for a specified individual computer system and constrained to be downloaded to and operable on only the specified individual computer system. The method and system further utilize an installation procedure for restoring the specified computer system to the software state that the computer was in at the time the computer left the factory after initial configuration and downloading. The custom-programmed CD ROM is delivered to a customer in combination with a bootable flexible diskette, and an instructional technical instruction sheet for usage by the customer to restore the computer system to a "factory new" software condition.

A protection technique is defined utilizing three components including the computer system, the custom-programmed CD ROM, and the bootable flexible diskette that are mutually and uniquely keyed so that loading of the software image is only possible when all three components are employed in combination. Thus a specific custom-programmed CD ROM and a specific bootable flexible diskette with the same keying can only be used to download software to the specific computer system hardware that has the same keying. The protection technique eliminates a possibility that the software image could be loaded onto any computer hardware other than the computer hardware keyed to receive the software. The protection technique uses cross-referencing tag identification (ID) numbers on all three key items including writing of the tag ID to the custom-programmed CD ROM and the bootable flexible diskette, and a unique service tag number of the computer hardware. Only a matched combination of the specific cross-keyed custom-programmed CD ROM, the specific associated bootable flexible diskette, and the uniquely-keyed computer hardware, employed together, allow reloading of the software image contained on the custom-programmed CD ROM.

A first operation in the protection technique is creation of a combination of uniquely-keyed custom-programmed CD ROM and bootable flexible diskette. An original customer order is processed and a specific customer-determined software image load is compiled according to the original customer order. The software image is usually downloaded to the computer system hardware in the factory, then shipped to a customer. The customer-determined software load is a software image specifically configured for writing to the hard disk drive of the specified computer system hardware. In combination with the software image, a tag identification (ID) file is written to the custom-programmed CD ROM that contains a Service Tag number of the specified computer system hardware that is authorized to receive the software image. The combination of the software image and the identification file are burned onto a CD ROM media platter. The specified bootable flexible diskette has a corresponding identification (ID) file written that contains the ID number of the custom-programmed CD ROM and the name of the identification file on the custom-programmed CD ROM that contains the tag information for the custom-programmed CD ROM. The bootable flexible diskette also stores a CD restoration program, an executable file that controls the process of restoring the software image to the computer system. The associated custom-programmed CD ROM and bootable flexible diskette are sent to the customer in combination with a service kit Technical direction sheet. The customer has the originally-ordered and configured computer system hardware.

Upon receipt by the customer, the service kit Technical direction sheet directs the customer to place the bootable flexible diskette in computer system flexible disk drive slot, place the custom-programmed CD ROM in the computer system CD ROM slot, and reboot the computer system. The bootable flexible diskette stores a CD restoration program that is activated upon boot loading of the computer system. The CD restoration program first downloads and opens the tag ID file contained on the CD image from the custom-programed CD ROM, In addition to opening the tag ID file on the custom-programmed CD ROM, the CD restoration program opens the ID file from the bootable flexible diskette and verifies that the tag information in the ID files match in the custom-programmed CD ROM and the bootable flexible diskette.

The CD restoration program includes an installation program that obtains the Service Tag number from the computer executing the installation program. The computer Service Tag number is compared to the tag information contained the ID file stored on the custom-programmed CD ROM. If the computer hardware Service Tag matches the tag ID on the custom-programmed CD ROM, the restoration program completes a hard drive restoration program by clearing the information on the hard drive and downloading the software image from the custom-programmed CD ROM to the hard disk drive. If the service tag numbers do not match, then the Service Tag number accessed from the computer hardware is reported to the customer along with instructions to the customer directing the customer to additional service assistance, Many advantages are achieved by the described system and operating method. One advantage is that the software transport system reduces the cost of troubleshooting and correcting software problems in the field. The software transport system advantageously reduces the initial field incidence rate of hard disk drives, a measure of reliability failures of computers upon initial delivery from the supplier. The software transport system advantageously reduces the number of hard disk drive failures that are not duplicated in testing upon return of the computer system.

The protection technique advantageously restricts utilization of licensed software to the single unique computer for which the license is granted while avoiding interference with the basic process that allows free software loading of the computer.

BRIEF DESCRIPTION OF THE DRAWINGS

The features of the described embodiments believed to be novel are specifically set forth in the appended claims. However, embodiments of the invention relating to both structure and method of operation, may best be understood by referring to the following description and accompanying drawings.

DETAILED DESCRIPTION OF THE PREFERRED EMBODIMENTS

Figure 1:
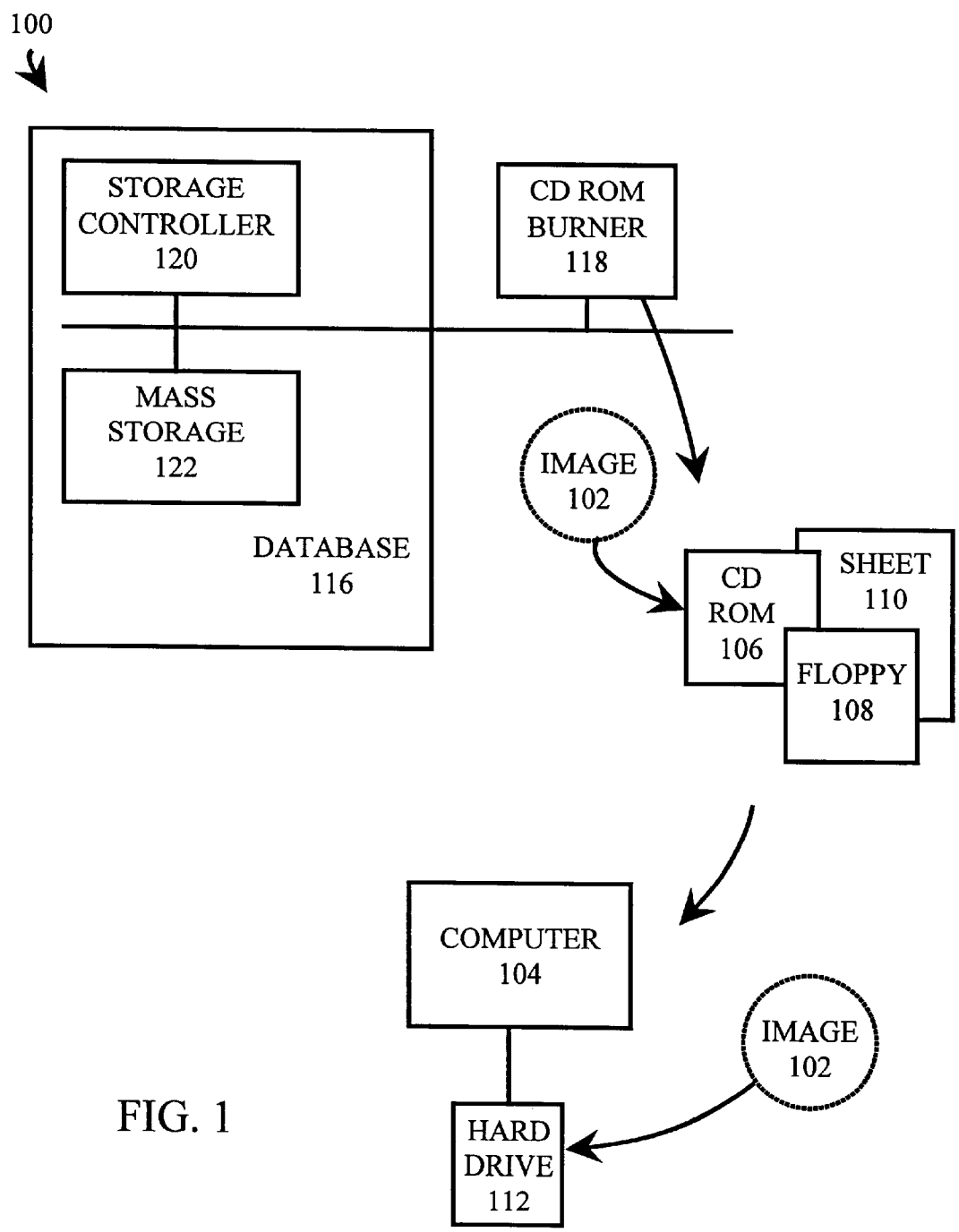
FIG. 1 is a schematic block diagram illustrating an embodiment of a software transport system for supplying a software image to a computer such as a personal computer (PC).

Referring to FIG. 1, a schematic block diagram illustrates an embodiment of a software transport system 100 for supplying a software image 102 to a computer 104 such as a personal computer (PC). The illustrative software transport system 100 includes a database 116 and a compact disk (CD) ROM burner 118 that operate in combination to produce three software transport components: (1) a custom-programmed compact disk (CD) ROM 106, (2) a bootable flexible diskette 108, and (3) a service kit Technical direction sheet 110. The three components, in combination, define and implement an installation procedure for restoring the computer 104 to a "factory new" software state that is identical to the state of the computer 104 at the time the computer 104 leaves the factory after initial configuration and downloading.

The three components have different purposes. The custom-programmed CD ROM 106 is a software transport medium for transferring the software image 102 to a main executable storage in the computer 104, typically a hard disk drive 112. The bootable flexible diskette 108 is a software download medium for controlling downloading from the custom-programmed CD ROM 106. The service kit Technical direction sheet 110 is an instruction list that instructs a user to download the software image 102 from the custom-programmed CD ROM 106 using the bootable flexible diskette 108.

The database 116 includes a mass storage controller 120, a mass storage 122 that typically includes a plurality of mass storage devices including hard disk drives, CD ROM drives, magnetic tapes, and the like. The mass storage controller 120 controls the mass storage 122 to access information such as software codes in various formats including source, object, absolute, binary codes, software images and the like. The mass storage controller 120 includes various programs for processing the software codes such as assemblers, compilers, linkers, and the like for forming a software image that is typically down-loaded to a hard disk drive in a computer for running programs.

In the illustrative embodiment, the mass storage controller 120 is connected to the mass storage 122 and the CD ROM burner 118 to transfer software codes from the mass storage 122 to a CD ROM medium. The mass storage controller 120 is also connectable to the computer 104 to download programs from the mass storage 122 to a hard disk drive 112 of the computer 104.

One operation of the mass storage controller 120 is the production of a software image 102 for downloading to the hard disk drive 112 of the computer 104 and subsequent program execution by the computer 104. A hardware and software configuration of the computer 104 is entered onto the mass storage controller 120 to determine the software components to be included in the software image 102. The mass storage controller 120 executes the various processing programs to produce the software image 102. The image is downloaded to the computer 104 and the hardware and software package making up the computer 104 are shipped to a customer. The process of supplying the software image, from entering the customer order to downloading the software is automated or semi-automated.

The same automated process is used to generate the custom-programmed CD ROM 106. The custom-programmed CD ROM 106 is made available to the customer in case difficulties arise in the computer system. In some systems, the software image 102 created during original programming of the computer system is stored in the mass storage 122. In other systems, the software image 102 is regenerated when needed simply by re-entering the original customer order.

For example in an illustrative system, the same automated process is used to generate a software image for downloading to a hard disk drive and to generate an image for burning onto a CD ROM. However, instead of downloading the image to a hard drive, the software image is transferred to the CD ROM burner 118 for writing the software image 102 to the custom-programmed CD ROM 106, the bootable flexible diskette 108 is programmed, and the CD ROM and diskette package are sent to the customer. The automated process advantageously exploits internal process control scripts built using an automated or semi-automated technique that generates the custom-programmed CD ROM 106 and the bootable flexible diskette 108 in a cost-effective and efficient manner. Although the control scripts are potentially complex, the automated technique facilitates generation of the software transport media without requiring skilled operators.

The custom-programmed compact disk (CD) ROM 106 is configured for a specified individual computer hardware and is constrained to be downloaded only to the specified individual computer for execution. The bootable flexible diskette 108 is individually coded to match the custom-programmed CD ROM 106 and the specified individual computer. The software image 102 formed on the custom-programmed CD ROM 106 precisely matches the configuration of the computer hardware to the detailed level of each device, bus, BIOS, device driver, and operating system. Advantageously, the software image 102 is written to the hard disk drive 112 and the computer 104 immediately is activated with the correct software configuration for driving the installed hardware.

The software transport system 100 further implements a protection technique by special configuration of the computer 104, the custom-programmed CD ROM 106, and the bootable flexible diskette 108 that are mutually and uniquely keyed so that loading of the software image is only possible when all three components are employed in combination.

The custom-programmed CD ROM 106 and bootable flexible diskette 108 form a common software transport system package, having the same identification keying, and are only usable to download the software image 102 to the specified computer hardware 104 having the same identification keying. Cross-referencing tag identification (ID) numbers are coded by applying the tag ID to the custom-programmed CD ROM 106 and the bootable flexible diskette 108. The computer hardware 104 also has a unique Service Tag identifier that specifically identifies a single computer. The Service Tag is typically a multiple-character alphanumeric string that is programmed or "burned" into a section of storage within the computer 104. In some systems, the Service Tag is burned into a hidden section of nonvolatile memory during the manufacturing process of the computer 104.

The protection technique prohibits loading of the software image 102 onto any computer hardware other than the computer hardware 104 keyed to receive the software image 102. Reloading of the software image 102 contained on the custom-programmed CD ROM 106 onto a hard disk drive 112 of the computer 104 is allowed only for a matched combination of the specific cross-keyed custom-programmed CD ROM 106, the specific associated bootable flexible diskette 108, and the uniquely-keyed computer hardware 104.

Figure 2:
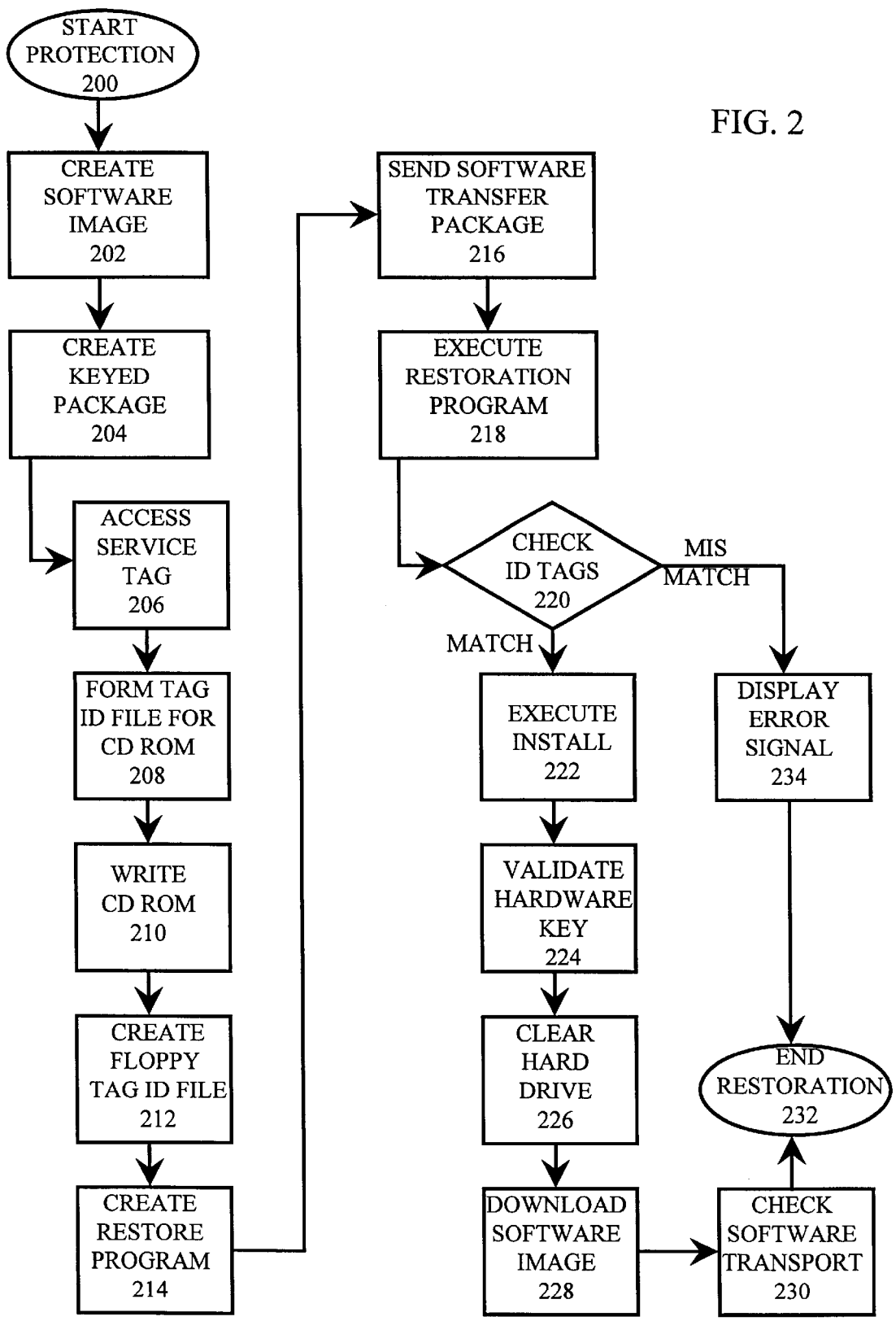
FIG. 2 is a flow chart that illustrates acts that are carried out in applying the protection technique of the software transport system.

Referring to FIG. 2 in combination with FIG. 1, a flow chart illustrates acts that are carried out in applying the protection technique 200 of the software transport system 100. The protection technique 200 advantageously restricts utilization of licensed software to the single unique computer for which the license is granted wile avoiding interference with the basic process that allows free software loading of the computer.

In a create software image operation 202, an original customer order is processed and a specific customer-determined software image 102 load is compiled according to the original customer order. The customer-determined load is a software image 102 that is specifically configured for writing to the hard disk drive 112 of the specified computer hardware 104. Accordingly, the software image 102 is the same as the hard disk image that is originally downloaded to the hard disk of the computer system hardware in the factory, then shipped to a customer.

Once the software image 102 is created, the protection technique 200 performs a create keyed package operation 204 in which key codes are formed for a combined uniquely-keyed custom-programmed CD ROM 106 and bootable flexible diskette 108. The keys are created by accessing the Service Tag number 206 of the specified computer hardware 104 that is authorized to receive the software image 102 and forming a tag identification (ID) file 208 containing the Service Tag number. In addition to a key based on the Service Tag, the tag ID forming operation 208 includes the act of generating a random number character. In the illustrative embodiment, the Service Tag from the computer 104 and the random number are used as a key that are written both to the custom-programmed CD ROM 106 and the bootable flexible diskette 108, thereby serving as a basic identifier for preventing utilization of licensed software on any computer other than the computer 104 for which the software is licensed.

A write CD ROM operation 210 burns the combined software image 102 and tag ID file onto the custom-programmed CD ROM medium.

Other operations of the create keyed package operation 202 prepare the bootable flexible diskette 108. A create flexible diskette ID file operation 212 forms an ID tag file containing tag information for the custom-programmed CD ROM 106 including coding of the Service Tag and the random number tag, and containing the name of the tag ID file on the custom-programmed CD ROM 106. The create flexible diskette ID file operation 212 then writes the ID tag file to the bootable flexible diskette 108. A create restoration program operation 214 stores a CD restoration program to the bootable flexible diskette 108. The CD restoration program is an executable file that is run by a users, such as a customer, to restore the software image 102 to the hard disk drive 112 of the computer 104. In some embodiments, the CD restoration program operates automatically, without user intervention. In some embodiments, the CD restoration program operates automatically with the only intervention being display of a warning message and a wait time to allow the user to respond to the warning message.

In a send software transfer package operation 216, a package including the custom-programmed CD ROM 106, the bootable flexible diskette 108, and the service kit Technical direction sheet 110 is sent to the user or customer. The user is presumed to have possession of the originally-ordered and configured computer system hardware 104. The service kit Technical direction sheet 110 supplies the user with instructions for using the custom-programmed CD ROM 106 and the bootable flexible diskette 108 to restore the hard disk drive 112 to the exact software condition of the computer 104 when shipped originally from the factory. Any software installed onto the computer 104 or data loaded to the hard disk drive 112 after original delivery are eliminated so that all data values and processor conditions are initialized.

The users receives the software transfer package and the service kit Technical direction sheet 110 directs the user to execute the restoration program 218 by placing the custom-programmed CD ROM 106 into the computer system CD ROM reader, inserting the bootable flexible diskette 108 in computer system flexible disk drive slot, and rebooting the computer 104. One technique for rebooting the computer 104 is to power down the computer, waiting about thirty seconds, and applying power to the computer 104. The bootable flexible diskette 108 stores the restoration program that is activated upon bootstrap loading of the computer 104. The execute restoration program act 218 simulates the software download part of the manufacturing process by modifying the master boot record of the hard disk drive 112 to invoke a special restoration operating system. Special operating system files including .EXE, .BAT, and CONFIG.SYS files are activated to load a CD ROM driver and find the software image 102 on the CD ROM.

In a check ID tags operation 220, the restoration program first downloads and opens the tag ID file contained on the CD image from the custom-programmed CD ROM 106. In addition to opening the tag ID file on the custom-programmed CD ROM 106, the restoration program opens the ID file from the bootable flexible diskette 108 and verifies that the tag information in the ID files match in the custom-programmed CD ROM 106 and the bootable flexible diskette 108.

In an execute installation program operation 222, an installation program obtains the Service Tag number from the computer 104, which is executing the installation program. The installation program is typically stored on the bootable flexible diskette 108 but may be stored in other storage devices, such as the custom-programmed CD ROM 106, in other embodiments.

The installation program accesses the Service Tag number in the computer 104 by one of several access techniques. Illustratively, the installation program accesses the Service Tag number using XBIOS calls that read selected storage locations in a processor of the computer 104. In other implementations, other techniques or combinations of techniques may be used to access the Service Tag number, For example, a protection technique that is applicable to multiple types of computer systems may use multiple techniques for accessing the Service Tag. In one implementation a computer system ID code is accessed by the installation program to determine the hardware and software platform of the executing computer, thereby indicating a suitable technique for accessing the Service Tag. For a first type of computer, XBIOS calls are used to access the Service Tag. A second type of computer has a Service Tag that is accessed via proprietary techniques for reading a CMOS ROM, a battery-supported nonvolatile memory or storage. A third type of computer has a Service Tag that is accessed using Desktop Management Interface (DMI) calls.

The system ID code designates the general type of computer. Usage of the system ID code of a computer to determine how to access the Service Tag is advantageous for allowing the software transport system 100 to support multiple types and generations of computers. Usage of different techniques for accessing the Service Tag is also advantageous for allowing the software transport system 100 to support computers running various operating systems. For example, access to internal etude locations differs for computers running Windows 95™ and Windows NT™ operating systems.

A validate hardware key operation 224 compares the Service Tag number of the computer 104 to the tag ID information contained the ID file stored on the custom-programmed CD ROM 106. If the Service Tag of the computer 104 matches the tag ID on the custom-programmed CD ROM 106, then the restoration program displays a warning message, waiting to allow the user to abort the restoration program, and then complete the hard disk drive restoration process. The warning message informs the user that the hard drive is about to be erased and supplies a button icon to abort the restoration process. Thus the user is allowed to abort the operation and transfer data before erasing important data from the hard disk.

The hard drive restoration process completes by clearing the information 226 on the hard drive 112 and downloading 228 the software image 102 from the custom-programmed CD ROM 106 to the hard disk drive 112. The restoration program clears the hard disk drive 112 by formatting the hard drive 112 to erase possibly corrupted data, insure proper operation of the drive, and eliminate any viruses that may have infected the drive 112. The restoration program downloads the software image 102 by copying all software originally ordered and configured from the custom-programmed CD ROM 106 onto the hard disk drive 112 in a correct order. As the filed are copied to the hard disk drive 112, file attributes are correctly assigned or reset for operation of the software image 102. The copy process is moderately time consuming, typically enduring for 10 to 25 minutes. Following copying of the files, a check software transport operation 230 execute; a routine that verifies that the software-hardware keying and software download were performed and executed correctly. The restoration program terminates 232 by displaying a message on the computer display requesting that the user remove the CD ROM from the reader, removing the bootable flexible diskette 108 from the drive, and rebooting the computer 104. Following the second reboot operation, the computer 104 is in the identical condition of the computer at the original delivery with the possible exception of differences resulting from any modifications made to the original software order by agreement between the user or customer and a factory representative.

In various embodiments, additional protection techniques may be implemented. For example in some systems, data from files on the custom-programmed CD ROM 106 may be changed in a defined manner prior to programming of the custom-programmed CD ROM 106. The restoration program reverses the defined changes as the software image 102 is written to the hard disk drive 112. The additional protection technique prevents unauthorized reading of data from the custom-programmed CD ROM 106 and writing of the data to disk using a utility program.

If the Service Tag of the computer 104 does not match the tag ID on the custom-programmed CD ROM 106, then the restoration program generates an error condition signal 234. The restoration program supplies diagnostic information, including the Service Tag number accessed from the computer hardware 104 and supplies instructions to the user directing the user to additional service assistance.

Figure 3A:
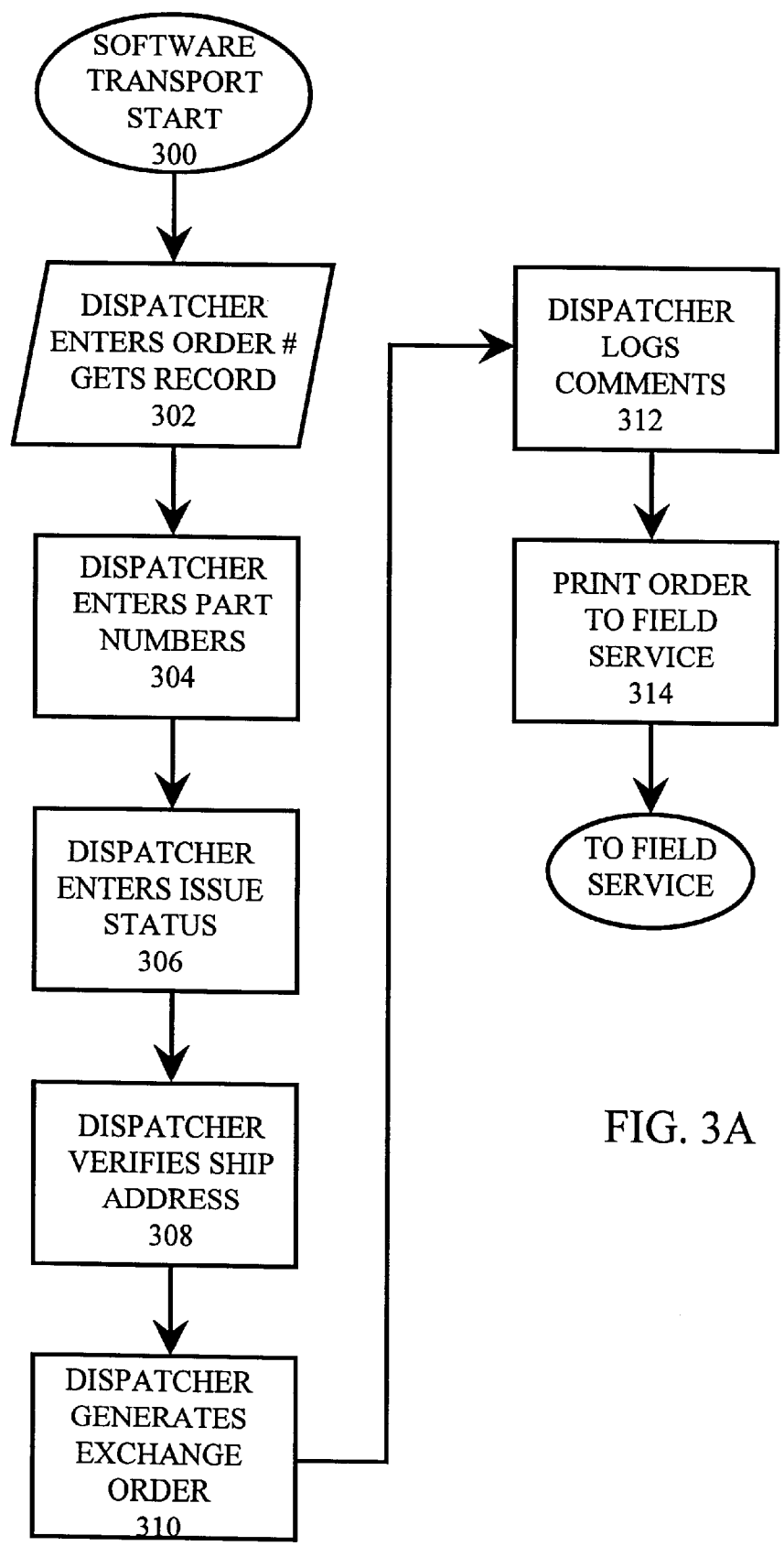
FIGS. 3A and 3B show a flow chart that illustrates acts that are performed to manufacture a software transport package.
Figure 3B:
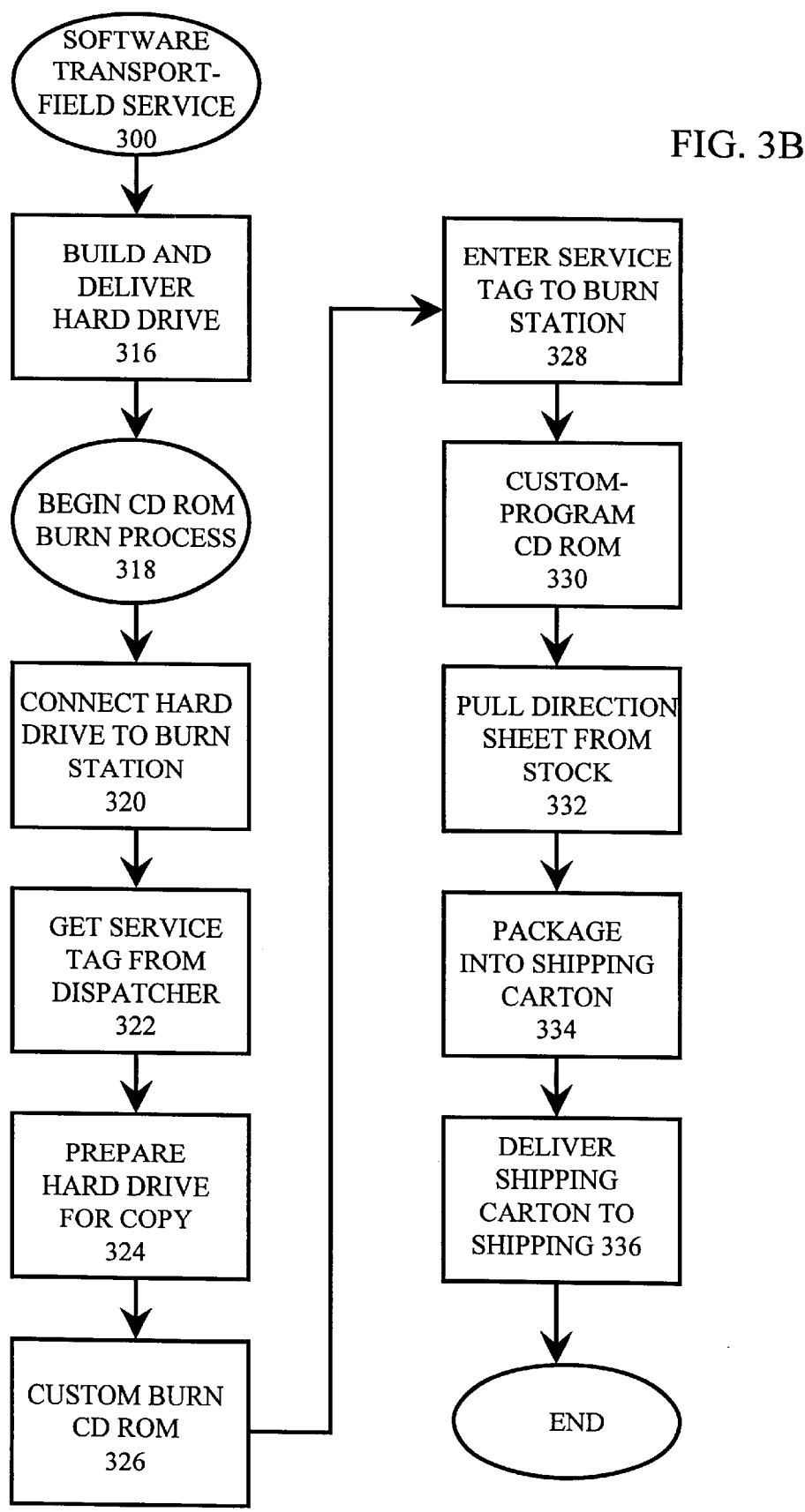

Referring to FIGS. 3A and 3B, a flow chart illustrates an exemplary process including acts that are performed to manufacture a software transport package. The software transport package includes a custom-programmed CD ROM 106, a bootable flexible diskette 108, and a service kit Technical direction sheet 110 for delivery to a customer.

A software transport package manufacturing process 300 begins when a dispatcher enters an order number into an automated/computerized system to retrieve a customer order record 302. The customer order record specifies customer-ordered software by part number. The dispatcher enters part numbers 304 for the software requested in the customer order. The dispatcher then enters a dispatch issue status 306 as a short order that includes a purchase order (PO) field, a shipping method, and tie numbers. The dispatcher verifies that the shipping address is correct 308. The dispatcher generates an exchange order number 310 and logs the dispatch into a dispatch comments log 312.

The logged order is automatically printed in field service 314. Field service builds and delivers a hard drive 316 including loaded customer-specified software to a CD ROM burn station.

The CD ROM burn station process begins 318 and field service personnel at the CD ROM bum station connect the hard drive to the CD burn station 320. The field service personnel look up a customer service tag from the dispatcher 322. The field service personnel then run a PREP_BAT routine 324 that prepares the hard disk drive for copying the software image, copies files from the hard disk drive to a flexible diskette, and runs a MAKETAG_EXE routine that makes the identification tags described hereinbefore for mutually associating the computer, CD ROM, and bootable flexible diskette. The PREP_BAT routine prompts entry of the Service Tag.

The field service personnel runs CDBURN_FLU 326 which bums the custom-programmed CD ROM 106. The field service personnel enters the Service Tag into the bum station software 328 and bums the custom-programmed CD ROM 106 with the customer-ordered software image 330. The field service personnel pulls a service kit Technical direction sheet 110 from stock 332 and places the custom-programmed CD ROM 106, the bootable flexible diskette 108, and the service kit Technical direction sheet 110 into a shipping carton 334. The field service personnel then delivers the shipping carton to shipping 336 for customer delivery.

Figure 4:
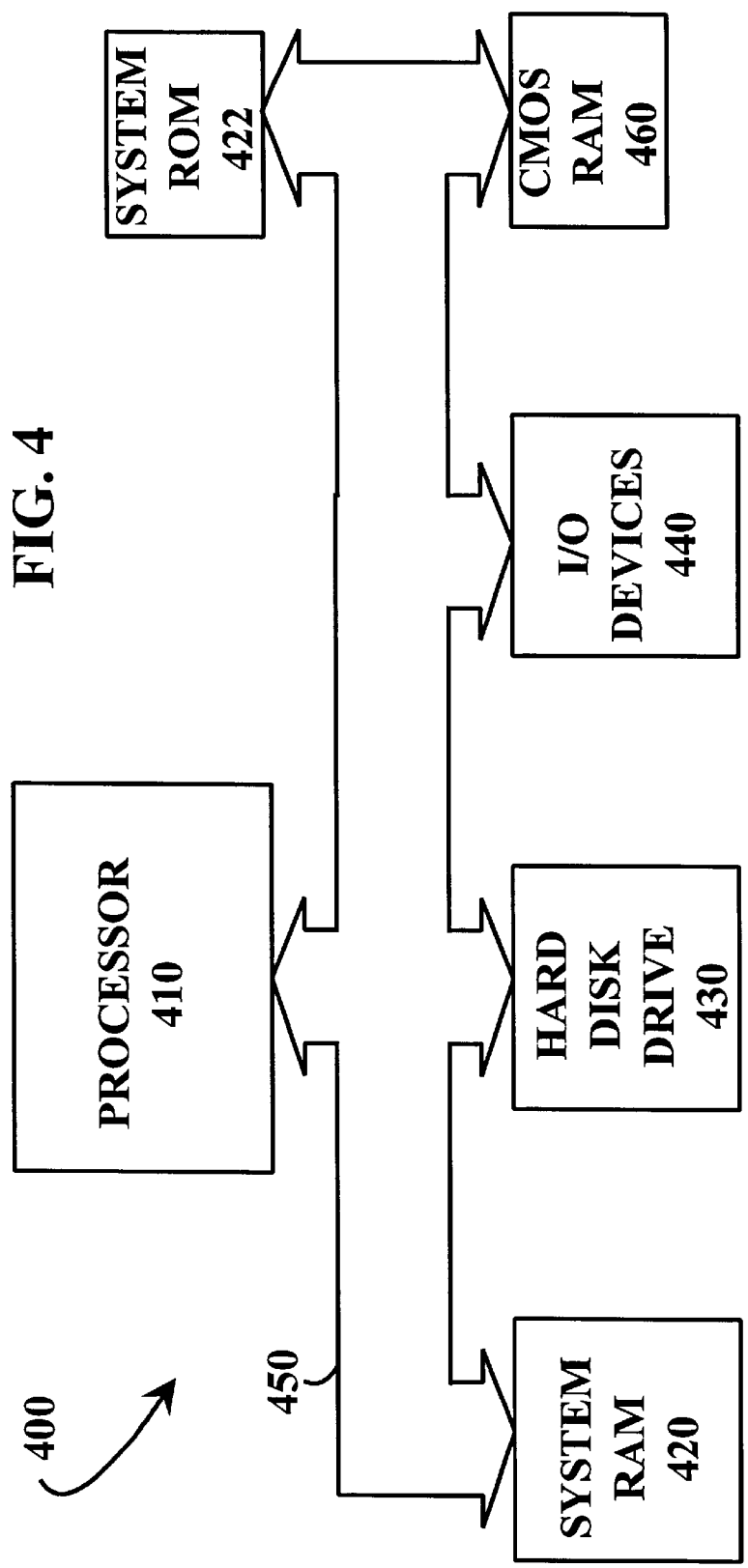
FIG. 4 is a block diagram which depicts computer system hardware implementing an operating system independent method for avoiding operating system security for operations performed by essential utilities.

Referring to FIG. 4, a computer system 400 is shown which runs a system for creating an operating system independent environment for executing utility programs. The computer system 400, typically a personal computer, includes a processor 410, a system random access memory (RAM) 420, a system ROM 422, a hard disk drive 430 and various other input/output devices 440. These system components communicate via a bus 450 which includes data, address and control lines. A CMOS clock nonvolatile RAM 460, which is connected to the processor 410 via the bus 450, is typically utilized to store information even when power to the computer system 400 is interrupted. Program instructions that make up the system for creating an operating system independent environment are stored in a storage device such as the hard disk drive 430 or the system ROM 422 connected to the processor 410. The processor 410, for example an x86 processor such as a 486, 586 or Pentium™ processor, executes the computing operations of the computer system 400.

Figure 5:
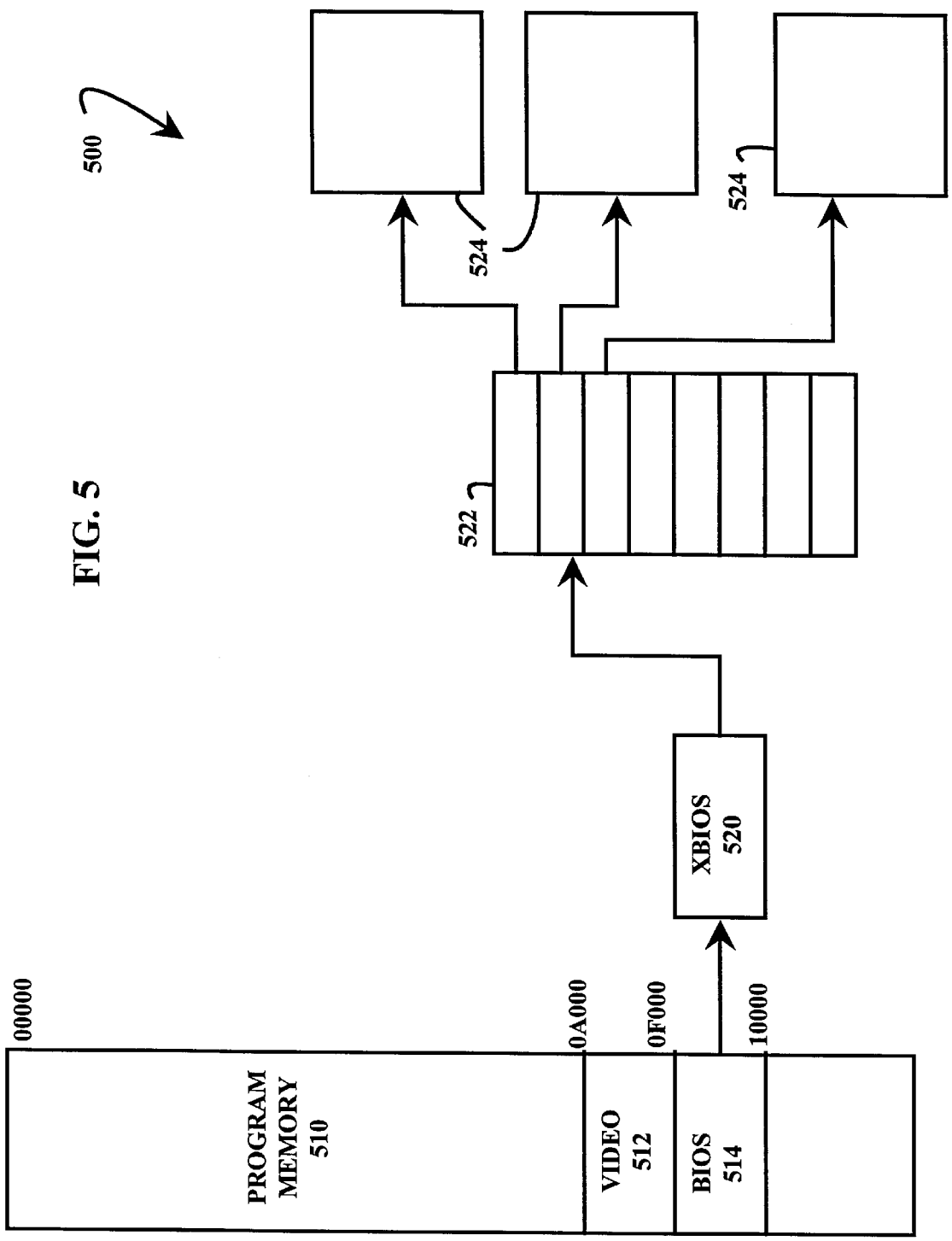
FIG. 5 is a pictorial illustration of a memory map of memory in the computer system shown in FIG. 4.

Referring to FIG. 5, a memory map 500 of a computer system shows a program memory 510 having a starting address of 0000H, a video memory 512 with a starting address of 0A000H and a BIOS memory 514 located at addresses 0F000H to 0FFFHH. A basic input output system (BIOS) is the part of an operating system that customizes the operating system to a specific computer. The BIOS forms the lowest-level interface to common devices such as a system clock, hard disk and display, for example. The BIOS memory 514 includes information for interfacing to an extension basic input output system XBIOS 520.

The XBIOS 520 extends BIOS functionality of a computer system. In particular, various computer system integrators include an XBIOS memory 520 to furnish extended features to the standard BIOS functionality. Some of these features are included to facilitate usage of programs for the benefit of the computer user. Specifically, with respect to functionality that is achieved by an embodiment in accordance with the present invention, BIOS functionality is used to pass an address of a control block to the system management mode (SMM), which performs an operation designated by the control block. One such operation is updating of the protected partition table. Another operation is the identification of a particular physical sector location on a disk drive. Other features that are typically performed by the BIOS may include management of a battery icon for displaying battery life remaining of a rechargeable battery and operating a control panel for setting power management parameters. The features also include WinCPL, an application that enables execution of power management functions without invoking a system setup operation. WinCPL controls various security operations such as setting of a password, control of speaker volume, enablement of simulated key click, modification of display parameters such as brightness and contrast. The features further include an asset tag utility that allows a computer user to assign an asset tag for identifying a particular computer system and to read the assigned asset tag. The asset tag is useful for identifying and inventory of computer systems for accounting purposes and the like. Still another feature is a monitor.exe executable file that controls video monitor parameters such as video bias, monitor refresh rate and the like.

The XBIOS 520 stores a plurality of pointers that point to entries in an XBIOS table 522. The XBIOS table 522 includes a plurality of pointers to memory addresses for various assigned application program functions 524. Each individual XBIOS program function 524 has a separate entry in the XBIOS table 522 and a separate entry point that is stored in the XBIOS table 522.

In one mode of operation, the program code in the XBIOS 520 operates by transferring operation identifiers and parameters to the CMOS memory 460 and performing an input/output instruction that evokes a SMI# signal. The SMI# signal is a signal for activating a system management mode (SMM) of operating. When a processor 410 recognizes a SMI# signal on an instruction boundary, the processor 410 waits for all store operations to complete. The processor 410 then saves the processor register state to a region in memory called a system management RAM (SMRAM) space and begins to execute a SMM handler routine. The SMI# interrupt has a greater priority than debug exceptions and external interrupts so that SMM processing preempts debug and external interrupt conditions. Subsequent SMI# and nonmaskable interrupt (NM) requests are not acknowledged while the processor is operating in system management mode.

System management mode (SMM) processing is conventionally performed by a technique in which software routines write a defined pattern or code to a specific defined SMI input/output I/O location. A pattern is defined to be suitably complex that an incorrect and unsuitable pattern is not inadvertently set. Generally, the patterns encode a sufficient amount of operational information that this level of complexity is easily achieved. Advantageously, the pattern coding is sufficiently specific to the precise XBIOS operations invoked that the security of a secured operating system is not compromised while useful functions are allowed to operate which would otherwise be prohibited by the operating system. The writing of this pattern to the SMI I/O location generates an SMI# signal, evoking a system management mode interrupt.

Figure 6:
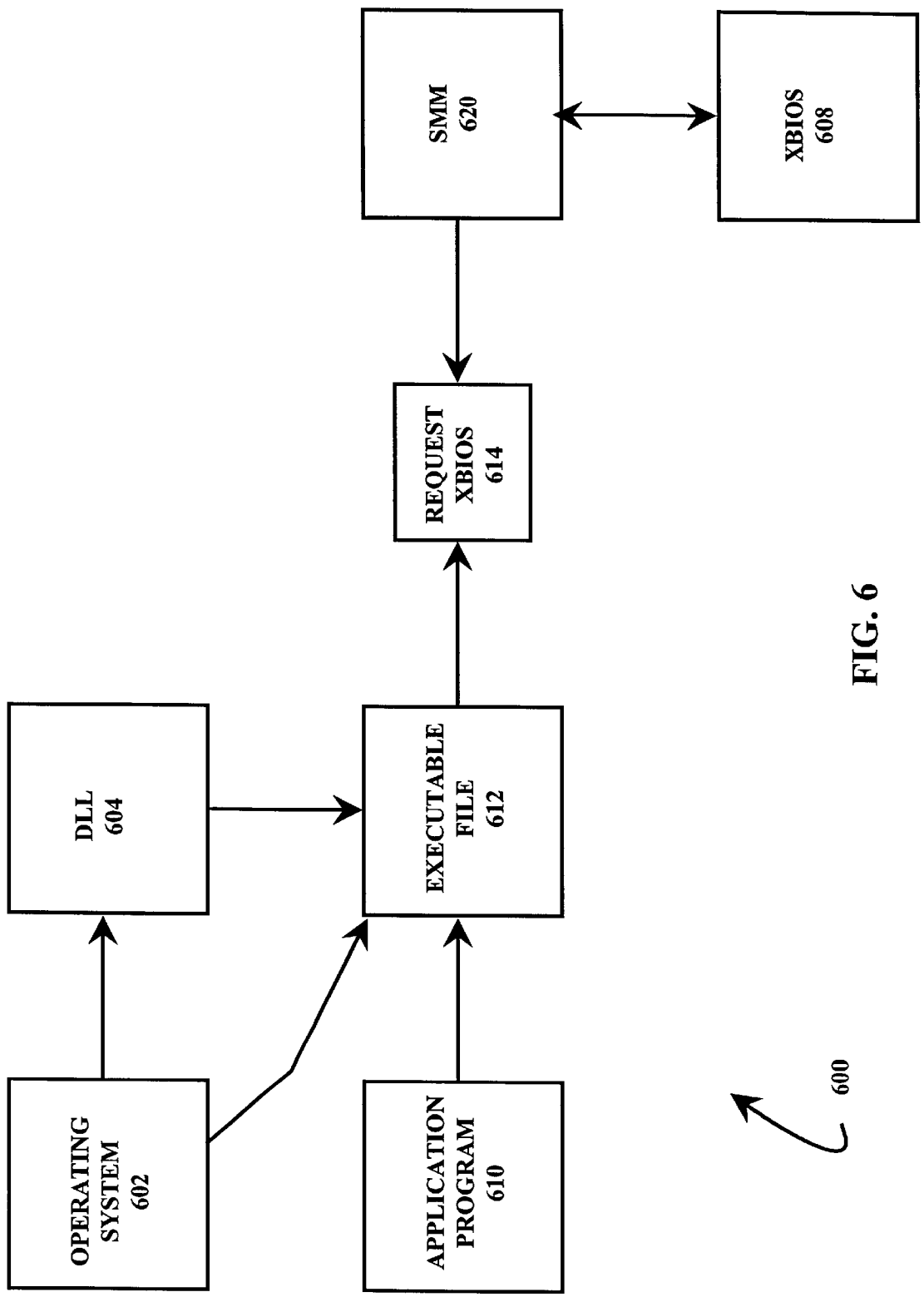
FIG. 6 is a block diagram which depicts various functional blocks of a software system that supplies full XBIOS functionality without voiding the security of the operating system.

Referring to FIG. 6, a block diagram is shown which depicts the operations of a software system 600 that supplies full XBIOS functionality, The software system 600 furnishes an interface for system management mode (SMM) operation. In this interface, an application program 610 does not directly attempt to invoke an SMI# interrupt, but instead the application program 610 calls the XBIOS 614 to request a SMM operation 620. The SMM operation 620 is activated independently of the operating system 602 operation and control.

In the software system 600, an application software program 610 is prepared for execution using dynamic linking capabilities of a target operating system 602, such as Windows NT™, Windows 95™, OS/2™ or the like, so that the dynamic linking environment includes a link step and a program loading step governed by the operating system 602. The linker scans a set of dynamic link libraries (DLL) 604. Some of the libraries include runtime support code that is linked into an executable file 612. Other libraries, called import libraries, contain references to functions that are not fully resolved until the operating system 602 loads the program executable file 612 for execution. A linker in the operating system 602 scans an import library and embeds a target module name and a numeric entry point into the executable file 612. When the operating system 602 loads the executable file 612 for execution, the operating system 602 replaces these references with addresses that are valid for usage in function calls. A dynamic link library (DLL) is a module that satisfies these references by dynamic linking. A DLL declares a set of entry points that satisfy external references.

Various libraries of the dynamic link libraries (DLL) 604 include operational code for making an XBIOS call which posts the XBIOS request 604, thereby initiating an XBIOS routine 608. The application program 610, which utilizes one or more XBIOS calls for various low-level functionality, assigns a data storage element for handling data. Typically, a known location in memory is assigned by the application program 610 for posting the signal 614 by storing information designating a particular system management function to be performed. However, some secure operating systems, such as Windows NT™, do not allow access or assignment of a particular known location in memory. Therefore in the software system 600, general purpose registers of the processor 410 are assigned to post the signal 614 and store the information designating a requested particular system management function and, upon servicing by the SMM operations 620 and XBIOS routines 608, to store a response of SMM/XBIOS processing. In some embodiments, tho software system 600 assigns 16-bit general purpose registers such as AX, BX, CX and DX for storing patterns for evoking SMM operations 620 and XBIOS routines 608. In other embodiments, 32-bit registers, such as EAX, EBX, ECX and EDX are used to store activation patterns.

While the invention has been described with reference to various embodiments, it will be understood that these embodiments are illustrative and that the scope of the invention is not limited to them. Many variations, modifications, additions and improvements of the embodiments described are possible. For example, those skilled in the art will readily implement the steps necessary to provide the structures and methods disclosed herein, and will understand that the process parameters, materials, and dimensions are given by way of example only and can be varied to achieve the desired structure as well as modifications which are within the scope of the invention. Variations and modifications of the embodiments disclosed herein may be made based on the description set forth herein, without departing from the scope and spirit of the invention as set forth in the following claims.

For example, the embodiments are described as systems for supplying protection and security features for the Windows NT™ and Windows 95™ operating systems. The invention is applicable with reference to other operating systems employing similar security measures, for example and OS/2™. Furthermore, the described embodiments discuss the usage of general purpose registers for communicating the polling signal. In other embodiments, other various types of temporary storage cells are applicable so long as these cells are not overwritten by the operating system.

What is claimed is:

1. A software transport package comprising:
   a software transport medium storing a software image, the software image being configured for downloading to and execution on a single unique computer, said software transport medium including a first tag identification file having an identification tag keyed to an identifier of the computer; and
   a software download medium storing a download program, the download program for controlling a downloading of the software image to a storage of the computer, said software download medium including a second tag identification file having an identification tag keyed to the identifier of the computer and an identification tag identifying the first tag identification file,
   wherein said software transport medium, said software download medium, and the computer are mutually keyed so that the software image is downloadable to the storage of only the single unique computer and no other, wherein the download program includes a routine executable by the computer for accessing the first tag identification file via identification information in the second tag identification file, accessing the identifier, mutually comparing the identifier to the identification tags in the first and second tag identification files, and transferring the software image from the software transport medium to the storage only if the identifier corresponds to the identification tags.

2. The software transport package according to claim 1 further comprising:
   an instruction sheet for directing a user in usage of the software download medium and the download program for controlling downloading of the software image to the storage.

3. The software transport package according to claim 1 wherein:
   the computer further includes a first media drive and a second media drive;
   said software transport medium is loadable to the first media drive; and
   said software download medium is loadable to the second media drive, further wherein, upon execution by the computer, the download program controls the downloading of the software image from the software transport medium to the storage.

4. The software transport package according to claim 3 wherein:
   the download program controls reformatting of the storage prior to downloading of the software image from the software transport medium to the storage.

5. The software transport package according to claim 4 wherein:
   the download program controls displaying of a warning message and waiting for intervention prior to reformatting of the storage.

6. The software transport package according to claim 3 wherein:
   the download program controls clearing of the storage prior to downloading of the software image from the software transport medium to the storage.

7. The software transport package according to claim 6 wherein:
   the download program controls displaying of a warning message and waiting for intervention prior to clearing of the storage.

8. The software transport package according to claim 1 wherein:
   the computer includes a compact disk (CD) ROM drive and a diskette drive, and the storage is a hard disk drive;
   the software transport medium includes a CD ROM; and
   the software download medium includes a diskette.

9. A software transport package comprising:
   a software transport medium storing a software image, the software image being configured for downloading to and execution on a single unique computer encoded with a unique identifier that distinguishes the computer from all other computers, said software transport medium including a first identification file that is keyed with the unique identifier; and
   a software download medium storing a download program, the download program for controlling a downloading of the software image to a storage of the computer, said software download medium including a second identification file that is keyed with the unique identifier, wherein said software transport medium, said software download medium, and the computer are mutually keyed so that the software image is downloadable to the storage of only the single unique computer and no other, wherein the download program includes a routine executable by the computer for accessing the first and second identification files, accessing the identifier, mutually comparing the identifier to identification keys in the first and second identification files, and transferring the software image from the software transport medium to the storage only if the identifier corresponds to the identification keys.

10. The software transport package according to claim 9 wherein:
    the second identification file is keyed with the unique identifier and keyed with an identifier of the first identification file, further wherein the download program includes a routine executable by the computer for accessing the first identification file via identification information in the second identification file.

11. A software transport package comprising:
    a software transport medium storing a software image, the software image being configured for downloading to and execution on a single unique computer encoded with a unique identifier that distinguishes the computer from all other computers, said software transport medium including a first identification file that is keyed with the unique identifier and a randomly-generated number; and
    a software download medium storing a download program, the download program for controlling a downloading of the software image to a storage of the computer, said software download medium including a second identification file that is keyed with the unique identifier and the randomly-generated number, wherein said software transport medium, said software download medium, and the computer are mutually keyed so that the software image is downloadable to the storage of only the single unique computer and no other, wherein the download program includes a routine executable by the computer for accessing the first and second identification files, accessing the identifier, mutually comparing a randomly-generated number key in the first identification file with a randomly-generated number key in the second indentification file, mutually comparing the identifier to identification keys in the first and second identification files, and transferring the software image from the software transport medium to the storage only if the randomly-generated number key of the first identification file corresponds to the randomly-generated number key of the second identification file and the identifier corresponds to the identification keys.

12. A computer program product including computer usable media having computable readable code embodied therein comprising:

a software transport medium storing a software image, the software image being configured for downloading to and execution on a single unique computer, the software transport medium including a first tag identification file having an identification tag keyed to an identifier of the computer; and a software download medium storing a download program, the download program for controlling a downloading of the software image to a storage of the computer, the software download medium including a second tag identification file having an identification tag keyed to the identifier of the computer and an identification tag identifying the first tag identification file, wherein the software transport medium, the software download medium, and the computer are mutually keyed so that the software image is downloadable to the storage of only the single unique computer and no other, wherein the download program includes a routine executable by the computer for accessing the first tag identification file via identification information in the second tag identification file, accessing the identifier, mutually comparing the identifier to the identification tags in the first and second tag identification files, and transferring the software image from the software transport medium to the storage only if the identifier corresponds to the identification tags.

13. The computer program product according to claim 12 further comprising:

an instruction sheet for directing a user in usage of the software download medium and the download program for controlling downloading of the software image to the storage.

14. The computer program product according to claim 12 wherein:

the computer further includes a first media drive and a second media drive;

the software transport medium is loadable to the first media drive; and the software download medium is loadable to the second media drive, further wherein upon execution by the computer, the download program controls the downloading of the software image from the software transport medium to the storage.

15. The computer program product according to claim 14 wherein:

the download program controls reformatting of the storage prior to downloading of the software image from the software transport medium to the storage.

16. The computer program product according to claim 15 wherein:

the download program controls displaying of a warning message and waiting for intervention prior to reformatting of the storage.

17. The computer program product according to claim 14 wherein:

the download program controls clearing of the storage prior to downloading of the software image from the software transport medium to the storage.

18. The computer program product according to claim 17 wherein:

the download program controls displaying of a warning message and waiting for intervention prior to clearing of the storage.

19. The computer program product according to claim 12 wherein;

the computer includes a compact disk (CD) ROM drive and a diskette drive, and the storage is a hard disk drive;

the software transport medium includes a CD ROM; and the software download medium includes a diskette.

20. A computer program product including computer usable media having computable readable code embodied therein comprising:

a software transport medium storing a software image, the software image being configured for downloading to and execution on a single unique computer encoded with a unique identifier that distinguishes the computer from all other computers, the software transport medium including a first identification file that is keyed with the unique identifier; and a software download medium storing a download program, the download program for controlling a downloading of the software image to a storage of the computer, the software download medium including a second identification file that is keyed with the unique identifier, wherein the software transport medium, the software download medium, and the computer are mutually keyed so that the software image is downloadable to the storage of only the single unique computer and no other, wherein the download program includes a routine executable by the computer for accessing the first and second identification files, accessing the identifier, mutually comparing the identifier to identification keys in the first and second identification files, and transferring the software image from the software transport medium to the storage only if the identifier corresponds to the identification keys.

21. The computer program product according to claim 20 wherein:

the second identification file is keyed with the unique identifier and keyed with an identifier of the first identification file, further wherein the download program includes a routine executable by the computer for accessing the first identification file via identification information in the second identification file.

22. A computer program product including computer usable media having computable readable code embodied therein comprising:

a software transport medium storing a software image, the software image being configured for downloading to and execution on a single unique computer encoded with a unique identifier that distinguishes the computer from all other computers, the software transport medium including a first identification file that is keyed with the unique identifier and a randomly-generated number; and a software download medium storing a download program, the download program for controlling a downloading of the software image to a storage of the computer, the software download medium including a second identification file that is keyed with the unique identifier and the randomly-generated number, wherein the software transport medium, the software download medium, and the computer are mutually keyed so that the software image is downloadable to the storage of only the single unique computer and no other, wherein the download program includes a routine executable by the computer for accessing the first and second identification files, accessing the identifier, mutually comparing a randomly-generated number key in the first identification file with a randomly-generated number key in the second indentification file, mutually comparing the identifier to identification keys in the first and second identification files, and transferring the software image from the software transport medium to the storage only if the randomly-generated number key of the first identification file corresponds to the randomly-generated number key of the second identification file and the identifier corresponds to the identification keys.

23. A computer comprising:

a processor;

a storage coupled to the processor, the storage for storing a software image that is executable by the processor;

a first media drive coupled to the processor;

a second media drive coupled to the processor; and a software transport package, wherein the software transport package includes:

a software transport medium that is loadable to the first media drive, the software transport medium storing the software image, the software image being configured for downloading to and execution on a single identified computer, the software transport medium including a first tag identification file having an identification tag keyed to an identifier of said computer; and a software download medium that is loadable to the second media drive, the software download medium storing a download program, the download program for controlling a downloading of the software image to the storage of the computer, the software download medium including a second tag identification file having an identification tag keyed to the identifier of the computer and an identification tag identifying the first tag identification file, wherein the software transport medium, the software download medium, and said computer are mutually keyed so that the software image is downloadable to the storage of only the single identified computer and no other, wherein the download program includes a routine executable by said processor for accessing the first tag identification file via identification information in the second tag identification file, accessing the identifier, mutually comparing the identifier to the identification tags in the first and second tag identification files, and transferring the software image from the software transport medium to the storage only if the identifier corresponds to the identification tags.

24. The computer according to claim 23 wherein:

the download program controls clearing of said storage prior to downloading of the software image to said storage.

25. The computer according to claim 24 wherein:

the download program controls displaying of a warning message and waiting for intervention prior to clearing of said storage.

26. The computer according to claim 23 wherein:

the download program controls reformatting of said storage prior to downloading of the software image to said storage.

27. The computer according to claim 26 wherein:

the download program controls displaying of a warning message and waiting for intervention prior to reformatting of said storage.

28. The computer according to claim 23 further comprising:

an instruction sheet for directing a user in usage of the software download medium and the download program for controlling downloading of the software image to said storage.

29. The computer according to claim 23 wherein:

said first media drive includes a compact disk (CD) ROM drive;

said second media drive includes a diskette drive;

said storage includes a hard disk drive;

the software transport medium includes a CD ROM; and the software download medium includes a diskette.

30. A computer comprising:

a processor;

a storage coupled to the processor, said storage for storing a software image that is executable by said processor;

a first media drive coupled to said processor;

a second media drive coupled to said processor; and a software transport package, wherein the software transport package includes:

a software transport medium that is loadable to said first media drive, the software transport medium storing the software image, the software image being configured for downloading to and execution on a single identified computer encoded with a unique identifier that distinguishes said computer from all other computers, the software transport medium including a first identification file that is keyed with the unique identifier; and a software download medium that is loadable to the second media drive, the software download medium storing a download program, the download program for controlling a downloading of the software image to said storage, the software download medium including a second identification file that is keyed with the unique identifier, wherein the software transport medium, the software download medium, and said computer are mutually keyed so that the software image is downloadable to said storage of only the single identified computer and no other, wherein the download program further includes a routine executable by said processor for accessing the first and second tag identification files, accessing the identifier, mutually comparing the identifier to identification keys in the first and second identification files, and transferring the software image from the software transport medium to said storage only if the identifier corresponds to the identification keys.

31. The computer according to claim 30 wherein:
the second identification file is keyed with the unique identifier and keyed with an identifier of the first identification file, further wherein the download program includes a routine executable by the processor for accessing the first identification file via identification information in the second identification file.

32. A computer comprising:
a processor;
a storage coupled to the processor, said storage for storing a software image that is executable by said processor;
a first media drive coupled to said processor;
a second media drive coupled to said processor; and
a software transport package, wherein the software transport package includes:
a software transport medium that is loadable to said first media drive, the software transport medium storing the software image, the software image being configured for downloading to and execution on a single identified computer encoded with a unique identifier that distinguishes said computer from all other computers, the software transport medium including a first identification file that is keyed with the unique identifier and a randomly-generated number; and
a software download medium that is loadable to the second media drive, the software download medium storing a download program, the download program for controlling a downloading of the software image to said storage, the software download medium including a second identification file that is keyed with the unique identifier and the randomly-generated number, wherein the software transport medium, the software download medium, and said computer are mutually keyed so that the software image is downloadable to said storage of only the single identified computer and no other, wherein the download program further includes a routine executable by said processor for accessing the first and second tag identification files, accessing the identifier, mutually comparing a randomly-generated number key in the first identification file with a randomly-generated number key in the second identification file, mutually comparing the identifier to identification keys in tile first and second identification files, and transferring the software image from the software transport medium to said storage only if the randomly-generated number key of the first identification file corresponds to the randomly-generated number key of the second identification file and the identifier corresponds to the identification keys.

33. A software protection system permitting software to be downloaded to a storage of an authorized computer alone, the authorized computer having an unique identifier, said software protection system comprising:
computer-readable media containing:
a software image formed for a hardware-software configuration of the authorized computer,
a tag identification file having an identification tag keyed to the unique identifier of the authorized computer; and
an executable file including a routine for accessing the unique identifier, comparing the unique identifier to the identification tag, and transferring the software image from the computer-readable media to the storage only if the unique identifier corresponds to the identification tag, wherein the computer-readable media includes:
a first medium containing:
the software image, and
a first tag identification file having the identification tag keyed to the unique identifier of the authorized computer; and
a second medium containing:
a second tag identification file having an identification tag keyed to the unique identifier of the authorized computer and an identification tag identifying the first tag identification file, and
the executable file, wherein the routine is further for accessing the first tag identification file via identification information in the second tag identification file, accessing the unique identifier, mutually comparing the unique identifier to the identification tags in the first and second tag identification files, and transferring the software image from the computer-readable media to the storage only if the unique identifier corresponds to the identification tags.

34. The software protection system according to claim 33 wherein:
the executable file routine accesses the unique identifier using an XBIOS call.

35. The software protection system according to claim 33 wherein:
the executable file routine accesses the unique identifier using a desktop management interface (DMI) call.

36. The software protection system according to claim 33 wherein:
the executable file routine accesses the unique identifier using a technique for reading a CMOS ROM.

37. The software protection system according to claim 33 wherein the executable file routine includes a subroutine for:
clearing the storage prior to transferring the software image from the computer-readable media to the storage.

38. The software protection system according to claim 37 wherein the executable file routine includes a subroutine for:
displaying a warning message; and
waiting for intervention prior to clearing the storage.

39. The software protection system according to claim 33 wherein the executable file routine includes a subroutine for:
reformatting the storage prior to transferring the software image from the computer-readable media to the storage.

40. The software protection system according to claim 39 wherein the executable file routine includes a subroutine for:
displaying a warning message; and
waiting for intervention prior to reformatting the storage.

41. The software protection system according to claim 33 wherein:
the first medium includes a custom-programmed compact disk (CD) ROM medium;
the second medium includes a bootable flexible diskette; and
the storage includes a hard disk drive.

42. A software protection system permitting software to be downloaded to a storage of an authorized computer alone, the authorized computer having an unique identifier, said software protection system comprising;
   computer-readable media containing:
      a software image formed for a hardware-software configuration of the authorized computer;
      a tag identification file having an identification tag keyed to the unique identifier of the authorized computer; and
      an executable file including a routine for accessing the unique identifier, comparing the unique identifier to the identification tag, and transferring the software image from the computer-readable media to the storage only if the unique identifier corresponds to the identification tag,
   wherein the computer-readable media includes:
      a first medium containing:
         the software image; and
         a first tag identification file having a first identification tag keyed to the unique identifier of the authorized computer and a second identification tag keyed to a randomly-generated number;
      a second medium containing:
         a second tag identification file having a third identification tag keyed to the unique identifier of the authorized computer and a fourth identification tag keyed to the randomly-generated number; and
         the executable file, the executable file including a routine for comparing the second identification tag to the fourth identification tag, accessing the unique identifier, mutually comparing the unique identifier to the first identification tag and the third identification tag, and transferring the software image from the computer-readable media to the storage only if the second identification tag corresponds to the fourth identification tag, and the unique identifier corresponds to the first identification tag and the second identification tag.

43. The software protection system according to claim 42 wherein:
   the first medium includes a custom-programmed compact disk (CD) ROM medium;
   the second medium includes a bootable flexible diskette; and
   the storage includes a hard disk drive.

44. The software protection system according to claim 42 wherein:
   the executable file routine accesses the unique identifier using a command selected from among an XBIOS call, a desktop management interface (DMI) call, and a technique for reading a CMOS ROM.

45. The software protection system according to claim 42 wherein:
   the executable file routine accesses the unique identifier using a command selected from among an XBIOS call, a desktop management interface (DMI) call, and a technique for reading a CMOS ROM; and
   the executable file routine accesses a system ID code Of the authorized computer and uses the system ID code to select the command.

46. The software protection system according to claim 42 wherein:
   the unique identifier is a Service Tag.

47. The software protection system according to claim 42 wherein:
   the executable file routine operates without user intervention.

48. A computer program product including computer usable media having computable readable code embodied therein comprising:
   a software protection system permitting software to be downloaded to a storage of an authorized computer alone, the authorized computer having an unique identifier, the software protection system including:
      a software image formed for a hardware-software configuration of the authorized computer;
      a tag identification file having an identification tag keyed to the unique identifier of the authorized computer; and
      an executable file including a routine for accessing the unique identifier, comparing the unique identifier to the identification tag, and transferring the software image from the computer-readable media to the storage only if the unique identifier corresponds to the identification tag,
   wherein the computer usable media includes:
      a first medium containing:
         the software image; and
         a first tag identification file having an identification tag keyed to the unique identifier of the authorized computer; and
      a second medium containing:
         a second tag identification file having an identification tag keyed to the unique identifier of the authorized computer and an identification information identifying the first tag identification file; and
         the executable file, the executable file including a routine for accessing first tag identification file via identification information in the second tag identification file, accessing the unique identifier, mutually comparing the unique identifier to the identification tags in the first and second tag identification files, and transferring the software image from the computer-readable media to the storage only if the unique identifier corresponds to the identification tags.

49. The computer program product according to claim 48 wherein:
   the first medium includes a custom-programmed compact disk (CD) ROM medium;
   the second medium includes a bootable flexible diskette; and
   the storage includes a hard disk drive.

50. A computer program product including computer usable media having computable readable code embodied therein comprising:
   a software protection system permitting software to be downloaded to a storage of an authorized computer alone, the authorized computer having an unique identifier, the software protection system including:
      a software image formed for a hardware-software configuration of the authorized computer;
      a tag identification file having an identification tag keyed to the unique identifier of the authorized computer; and
      an executable file including a routine for accessing the unique identifier, comparing the unique identifier to the identification tag, and transferring the software image from the computer-readable media to the storage only if the unique identifier corresponds to the identification tag, wherein the computer usable media includes:
a first medium containing:
the software image; and
a first tag identification file having a first identification tag keyed to the unique identifier of the authorized computer and a second identification tag keyed to a randomly-generated number;
a second medium containing:
a second tag identification file having a third identification tag keyed to the unique identifier of the authorized computer and a fourth identification tag keyed to the randomly-generated number; and
the executable file, the executable file including a routine for comparing the second identification tag to the fourth identification tag, accessing the unique identifier, mutually comparing the unique identifier to the first identification tag and the third identification tag, and transferring the software image from the computer-readable media to the storage only if the second identification tag corresponds to the fourth identification tag, and the unique identifier corresponds to the first identification tag and the second identification tag.

51. The computer program product according to claim 50 wherein:

the first medium includes a custom-programmed compact disk (CD) ROM medium;

the second medium includes a bootable flexible diskette; and the storage includes a hard disk drive.

* * * * *